US011829627B2

(12) United States Patent
Roberts et al.

(10) Patent No.: US 11,829,627 B2
(45) Date of Patent: Nov. 28, 2023

(54) DATA MIGRATION SCHEDULE PREDICTION USING MACHINE LEARNING

(71) Applicant: Micron Technology, Inc., Boise, ID (US)

(72) Inventors: David Andrew Roberts, Wellesley, MA (US); Aliasger Tayeb Zaidy, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 43 days.

(21) Appl. No.: 17/403,366

(22) Filed: Aug. 16, 2021

(65) Prior Publication Data
US 2023/0051103 A1 Feb. 16, 2023

(51) Int. Cl.
*G06F 12/00* (2006.01)
*G06F 13/00* (2006.01)
*G06F 3/06* (2006.01)
*G06N 3/04* (2023.01)
*G06N 3/08* (2023.01)

(52) U.S. Cl.
CPC .......... *G06F 3/0647* (2013.01); *G06F 3/0625* (2013.01); *G06F 3/0685* (2013.01); *G06N 3/04* (2013.01); *G06N 3/08* (2013.01)

(58) Field of Classification Search
CPC .... G06F 3/0647; G06F 3/0625; G06F 3/0685; G06N 3/04; G06N 3/03
USPC ........................................................ 711/165
See application file for complete search history.

(56) References Cited

U.S. PATENT DOCUMENTS

| 9,652,471 | B1* | 5/2017 | Krishnan .............. G06F 3/0611 |
| 9,727,241 | B2 | 8/2017 | Loh et al. |
| 9,934,148 | B2 | 4/2018 | Roberts et al. |
| 10,339,455 | B1* | 7/2019 | Parush-Tzur .......... G06F 3/061 |
| 10,365,996 | B2 | 7/2019 | Gupta et al. |
| 10,496,315 | B1* | 12/2019 | Niu ....................... G06F 3/0685 |
| 10,838,869 | B1 | 11/2020 | Avron et al. |
| 11,137,926 | B1* | 10/2021 | Pendharkar .......... G06F 3/0611 |
| 11,194,473 | B1* | 12/2021 | Zhao ..................... G06F 3/0647 |
| 2006/0129771 | A1 | 6/2006 | Dasgupta et al. |
| 2011/0010514 | A1 | 1/2011 | Benhase et al. |
| 2011/0066790 | A1 | 3/2011 | Mogul et al. |
| 2017/0048320 | A1 | 2/2017 | Farmahini-farahani et al. |
| 2017/0262216 | A1 | 9/2017 | Polkovnikov et al. |
| 2017/0277441 | A1 | 9/2017 | Gupta et al. |
| 2017/0308297 | A1 | 10/2017 | Roberts et al. |
| 2018/0276263 | A1* | 9/2018 | Voigt .................... G06F 9/4881 |
| 2019/0026048 | A1* | 1/2019 | Muehge ................. G06N 3/08 |
| 2019/0347125 | A1* | 11/2019 | Sankaran ............ G06F 9/30189 |
| 2019/0364492 | A1* | 11/2019 | Azizi ................... H04W 24/08 |

(Continued)

OTHER PUBLICATIONS

Doudali, Thaleia, "Kleio: A Hybrid Memory Page Scheduler with Machine Intelligence", Proceedings of the 28th International Symposium on High-Performance Parallel and Distributed Computing HPDC '19 Slide Deck, (2019), 22 pgs.

(Continued)

*Primary Examiner* — Sheng Jen Tsai
(74) *Attorney, Agent, or Firm* — Schwegman Lundberg & Woessner, P.A.

(57) ABSTRACT

Various embodiments provide for one or more processor instructions and memory instructions that enable a memory sub-system to predict a schedule for migrating data between memory devices, which can be part of a memory sub-system.

20 Claims, 11 Drawing Sheets

(56) References Cited

U.S. PATENT DOCUMENTS

| | | | | |
|---|---|---|---|---|
| 2020/0081802 A1* | 3/2020 | Solihin | ............... | G06F 11/1004 |
| 2020/0233598 A1* | 7/2020 | Bezugly | ................ | G06F 3/0689 |
| 2020/0233612 A1* | 7/2020 | Dalmatov | ............. | G06F 3/0631 |
| 2020/0326871 A1* | 10/2020 | Wu | ........................ | G06F 3/0647 |
| 2020/0341943 A1* | 10/2020 | Sarkar | ................... | G06F 16/113 |
| 2021/0342836 A1* | 11/2021 | Cella | ........................ | H04L 67/12 |
| 2022/0043752 A1* | 2/2022 | Hua | ..................... | G06F 12/0862 |
| 2022/0198562 A1* | 6/2022 | Cella | ........................ | G06Q 40/04 |
| 2022/0357891 A1* | 11/2022 | Wang | ..................... | G06F 3/0688 |

OTHER PUBLICATIONS

Doudali, Thaleia Dimitra, "Kleio: A Hybrid Memory Page Scheduler with Machine Intelligence", High Performance Distributed Systems (Best Paper Nominees) HPDC '19, Jun. 22-29, 2019,, (Jun. 2019), 12 pgs.

Shevgoor, Manjunath, "Efficiently Prefetching Complex Address Patterns", 2015 48th Annual IEEE ACM International Symposium on Microarchitecture (MICRO), (2015), 12 pgs.

"International Application Serial No. PCT/US2022/031290, International Search Report dated Sep. 21, 2022", 4 pgs.

"International Application Serial No. PCT/US2022/031290, Written Opinion dated Sep. 21, 2022", 4 pgs.

\* cited by examiner

US 11,829,627 B2

DATA MIGRATION SCHEDULE PREDICTION USING MACHINE LEARNING

This invention was made with Government support under Subcontract Number 4000165069 awarded by Oak Ridge National Labs. The Government has certain rights in this invention.

TECHNICAL FIELD

Embodiments of the disclosure relate generally to memory devices and, more specifically, to use machine learning to predict a schedule for migrating data between memory devices, which can be part of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
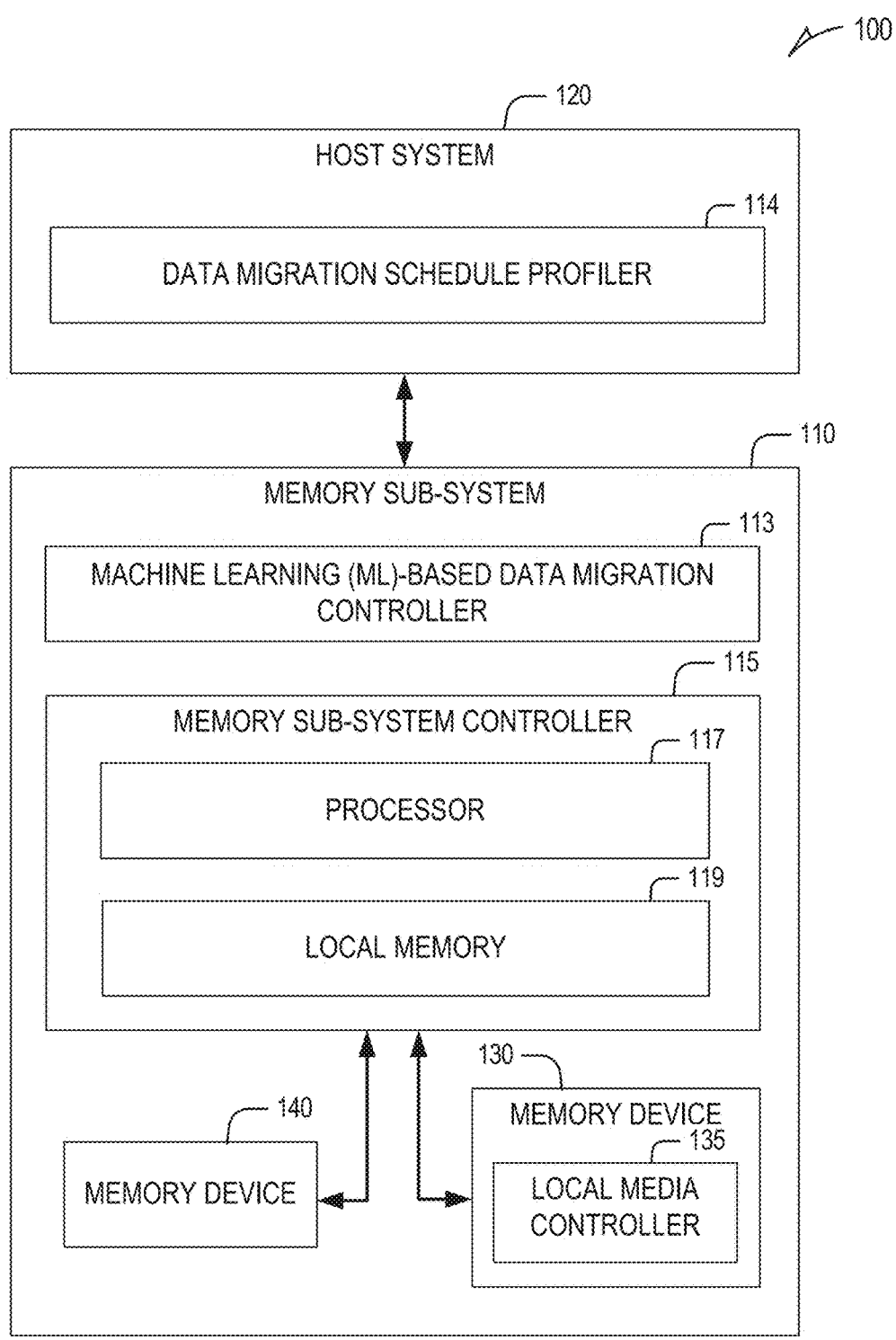
FIG. 1 is a block diagram illustrating an example computing system that includes a memory sub-system, in accordance with some embodiments of the present disclosure.

Aspects of the present disclosure are directed to predicting a schedule for migrating data between memory devices, which can be part of a memory sub-system. In particular, various embodiments described herein provide for using machine learning to predict when to migrate or consider migrating (e.g., moving) a memory unit (e.g., page or block) of data between two or more memory devices (e.g., of different types). A memory sub-system can be a storage device, a memory module, or a hybrid of a storage device and memory module. Examples of storage devices and memory modules are described below in conjunction with FIG. 1.

In general, a host system can utilize a memory sub-system that includes one or more components, such as memory devices that store data. The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example, as initiated by the firmware, is hereinafter referred to as "garbage collection data."

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

Predictors are commonly used in computer systems or processors in various ways, such as hardware branch predictors, as instruction and data prefetchers, as operating system (OS) page schedulers, or as hardware-based page schedulers. Generally, prefetchers can predict which cache lines of a memory device will be needed in the future and can preemptively load them into a cache memory (or cache) to reduce data access latency. In comparison, page schedulers can predict the future level of read and write activity to a memory unit (e.g., block of data) of data and can move the memory unit, ahead of time, to an appropriate memory device that will optimize performance, energy usage, or both with respect to operations performed on the memory unit.

Conventional predictors within computer processors (e.g., memory prefetchers) make a prediction at fixed intervals or are triggered by all memory requests or instructions. Unfortunately, this can be costly and inefficient because different data benefit from predictions at widely varying rates. This is especially true when predictors are complex or have high latency, such as a predictor implemented using a Deep Neural Network (DNN).

Aspects of the present disclosure address the above and other deficiencies by configuring a system component, such as a controller of a memory sub-system, to predict a schedule for migrating data between memory devices. In particular, various embodiments described herein use a first machine learning model (also referred to herein as a schedule machine learning model) to predict when to migrate or consider migrating (e.g., moving) a memory unit (e.g., page or block) of data between two memory devices (e.g., within a memory sub-system). For example, where an embodiment uses the prediction to determine when to consider migration of the memory unit, the embodiment can use a second machine learning model (also referred to herein as an access count machine learning model), such as one trained on historical access count of the memory unit (e.g., page predictor), to predict what an access count of the memory unit (e.g., data access frequency of the memory unit) will be in the future (e.g., during a future time interval). Based on this predicted access count, the embodiment can decide whether to migrate the memory unit between the two memory devices and can cause this migration accordingly.

According to some embodiment, a machine learning model (e.g., schedule predictor) generates time predictions (e.g., schedule prediction) for migration of a memory unit of data, which can determine when or how often in the future a next time prediction (e.g., next schedule prediction) should be generated by the machine learning model. Depending on the embodiment, the machine learning model (for generating time predictions for a memory unit of data) can comprise a DNN, which can be trained based on a data access frequency/count of the memory unit by a software application over a series of time intervals (e.g., N number of time intervals). Some embodiments provide for dynamic correction (e.g., dynamic schedule correction) of the machine learning model (e.g., schedule predictor), where based on observed effectiveness/accuracy of a previous time prediction, the machine learning model is adjusted (e.g., by DNN transfer learning). Additionally, some embodiments control (e.g., task-based schedule predictor hardware) issuance of requests for access count predictions (e.g., to a page predictor) based on expected utility of the requests, where the control can include intelligently dropping one or more access count prediction requests based on certain conditions. For instance, an embodiment can use one or more hardware accelerators (e.g., deep learning accelerator (DLA)) to operate a DNN (e.g., DNN-based page scheduler) for generating access count predictions as described herein, and the embodiment can control issuance of requests for access count predictions according to, for example, availability of the hardware accelerators, ranking of the requests, or priority of the requests.

By use of various embodiments, a memory sub-system can reduce the burden on limited predictor (e.g., page predictor) resources (e.g., hardware) used to generate access count predictions and can do so by choosing to invoke the predictor under certain conditions (e.g., only on memory units of data storing the most important data). Use of various embodiments can enable selective prioritization of access count prediction requests and dropping one or more of the requests as needed. Additionally, use of various embodiments can increase performance of a memory sub-system and reduce its energy consumption.

Though various embodiments are described herein with respect to a data migration controller (e.g., a machine learning-based data migration controller) of a memory sub-system that is separate from a memory sub-system controller of the memory sub-system, some embodiments implement features described herein (e.g., operations for copying, moving, or swapping data across different memory tiers) as part of a memory device (e.g., a controller, processor, or state machine of a memory die) or as part of the memory sub-system controller itself.

As used herein, a memory unit of data comprises a page or a block of data stored on a memory sub-system and corresponding to a logical memory address (e.g., LBA) of the memory sub-system. As used herein, a logical memory address of a memory sub-system can map to one or more physical memory addresses of a memory device of the memory sub-system.

As used herein, a time interval can comprise an epoch and can represent a unit of time of operation of a software application that is accessing one or more memory units of data stored on a memory sub-system. Additionally, as used herein, an application time indicator can correspond to progress through an application program that a predictor described herein is trained on. An application time indicator for a given software application can comprise, for example, a count of instructions executed by the software application, function calls by the software application, or the like.

For some embodiments, the migration of a memory unit of data is performed between two different tiers (or memory tiers) of a memory sub-system. As used herein, a tier/memory tier can refer to a logical memory performance level of the memory sub-system, where two different memory devices of the memory sub-system can be associated with a different tier. A given tier can be associated, for example, with a speed, a feature, available storage, power usage, or memory type of the memory sub-system. For instance, a first memory tier can be associated with one or more memory devices of the memory sub-system that are of a first memory type, such as non-volatile memory random access memory (NVRAM), while a second memory tier can be associated with one or more memory devices of the memory sub-system that are of a second memory type, such as dynamic random access memory (DRAM). An example of this can include a hybrid memory sub-system that comprises a non-volatile memory (NVM) tier and a DRAM tier. During operation of the memory sub-system, a memory controller can store data on different memory tiers for different purposes.

Disclosed herein are some examples predicting a schedule for migrating data between memory devices, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a PCIe interface, Computer Express Link (CXL) interface, Gen-Z interface, USB interface, Fibre Channel, Serial Attached SCSI (SAS), Small Computer System Interface (SCSI), a double data rate (DDR) memory bus, a DIMM interface (e.g., DIMM socket interface that supports DDR), Open NAND Flash Interface (ONFI), DDR, Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as DRAM and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional 2D NAND and 3D NAND.

Each of the memory devices 130 can include one or more arrays of memory cells. One type of memory cell, for example, single-level cells (SLCs), can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive instructions, commands, or operations from the host system 120 and can convert the instructions, commands, or operations into appropriate instructions or commands to achieve the desired access to the memory devices 130 and/or the memory device 140. The memory sub-system controller 115 can be responsible for other operations such as wear leveling operations, garbage collection operations, ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

As shown, the memory sub-system 110 includes a machine learning (ML)-based data migration controller 113 to implement an embodiment described herein with respect to the memory sub-system 110, and the host system 120 includes a data migration schedule profiler 114 to implement an embodiment described herein with respect to the host system 120. For instance, the ML-based data migration controller 113 can enable the memory sub-system 110 to predict a schedule for migrating data between memory devices (e.g., 130, 140) based on a schedule machine learning model (e.g., DNN-based schedule predictor). In comparison, the data migration schedule profiler 114 can enable the host system 120 to profile data access frequency/count of the memory sub-system 110 by a software application operating on the host system 120, and to train the schedule machine learning model based on the profile. Additionally, the data migration schedule profiler 114 can enable the host system 120 to cause the memory sub-system 110 to load and use the schedule machine learning model after the schedule machine learning model is trained. For some embodiments, at least a portion (if not all) of the data migration schedule profiler 114 can be implemented as part of the memory sub-system 110.

For some embodiments, the machine learning-based data migration controller 113 is implemented, at least in part, by the memory sub-system controller 115. Additionally, for some embodiments, the machine learning-based data migration controller 113 is implemented, at least in part, by the processing device 117 of the memory sub-system 110.

According to some embodiments, the memory sub-system 110 monitors access count for each of one or more memory units (e.g., blocks) of data stored on one of the memory devices 130, 140 over a series of time intervals. Based on monitored access counts, one or more memory units of data that are frequently accessed (e.g., "hot data") can be stored on (or moved to) one of the memory devices 130, 140 (e.g., the memory device that provides best data performance, such as low-latency data access or high data bandwidth), while one or more memory units of data that are not frequently accessed (e.g., "cold data") can be stored on (or moved to) the other of the memory devices 130, 140 (e.g., the memory device that is slower, cheaper, or denser memory). Over time, a memory unit of data can be migrated between the memory devices 130, 140 as the level of access (e.g., hotness or coldness of the memory unit based on access count) changes.

According to some embodiments, a memory unit predictor (e.g., page predictor) is used to predict an access count of a memory unit (e.g., page or block) of data, stored on one of the memory device 130, 140, for a future time interval (e.g., next time interval). This predicted access count can represent a predicted, next interval data access level (e.g., hotness level) of the memory unit (e.g., page or block). By using the memory unit predictor to predict an access count of a given memory unit (e.g., page or block) of data for a future time interval (e.g., next time interval), the memory sub-system 110 of some embodiments can predict a future access level (e.g., predict hotness or coldness) of the given memory unit prior to the future time interval and can migrate (e.g., move) the given memory unit to one of the memory devices 130, 140 accordingly prior to the future access level occurring. Depending on the embodiment, each memory unit (e.g., block) of data can have a different sequence of transitions between hot and cold data access levels or, for a multi-tiered memory system, can have intermediate data access levels. For some embodiments, the memory unit predictor can form at least part of the machine learning-based data migration controller 113.

For some embodiments, the machine learning-based data migration controller 113 enables the memory sub-system 110 to selectively use the memory unit predictor to predict an access count of a memory unit of data (e.g., data access level or hotness level) based on an expected/anticipated change in the access count (e.g., change in data frequency) of the memory unit (e.g., the expected/anticipated change exceeds a threshold value). According to some embodiments, the machine learning-based data migration controller 113 uses a schedule machine learning model (e.g., a schedule predictor) that can predict when (e.g., a time prediction) an expected/anticipated change in the access count (e.g., change in data frequency) of a given memory unit of data will exceed a threshold value, which can indicate a significant change in the access count (e.g., data frequency). A time prediction can describe when an expected/anticipated change in the access count of a given memory unit of data will exceed a threshold value and can describe a future time interval that is relative to a current time interval at which the time prediction is generated (e.g., outputted) by the schedule machine learning model. As a result, a time prediction generated by the schedule machine learning model for a given memory unit of data (stored on one of the memory devices 130, 140) can indicate when the machine learning-based data migration controller 113 should consider (but not necessarily perform) a migration of the given memory unit between the memory devices 130, 140. The schedule machine learning model can receive as input data that identifies the given memory unit of data (e.g., identified by a logical memory address corresponding to the given memory unit) and, additionally, the schedule machine learning model can receive as input data that describes a current time interval (e.g., current epoch). In response to the input, the schedule machine learning model can generate as output data the time prediction for the given memory unit. For some embodiments, considering migration of the given memory unit based on the time prediction comprises the machine learning-based data migration controller 113 using an access count machine learning model (e.g., page predictor) to generate a predicted access count for the given memory unit for a future time interval and then migrating the given memory unit between the memory devices 130, 140 based on the predicted access count. The access count machine learning model can receive as input data that identifies the given memory unit of data (e.g., identified by a logical memory address corresponding to the given memory unit) and, additionally, the schedule machine learning model can receive as input data that describes a current time interval (e.g., current epoch). In response to the input, the access count machine learning model can generate as output data the predicted access count for the given memory unit for a next (subsequent) time interval.

A training process for the schedule machine learning model (e.g., via the data migration schedule profiler 114) can be used (e.g., when the schedule machine learning model is offline) to determine or observe when the memory sub-system 110 should expect a change in data access count for a given memory unit of data where the change exceeds a threshold value (e.g., when the memory sub-system 110 should expect a significant access count change). This determination/observation can be with respect to one or more specific software applications that operate on the host system 120 and access the given memory unit of data during their operation. The schedule machine learning model of an embodiment can comprise a DNN trained to generate time predictions for one or more individual memory units of data stored on one of the memory devices 130, 140 (as described herein). Additionally, after the schedule machine learning model is trained to generate time predictions (as described herein) for one or more individual memory units of data, the schedule machine learning model can be loaded into a memory of the memory sub-system 110 (e.g., memory reserved for the schedule machine learning model) to be used by the machine learning-based data migration controller 113 to generate time predictions as appropriate. For instance, the schedule machine learning model comprises a DNN, the machine learning-based data migration controller 113 can use one or more DLAs to operate the schedule machine learning model, and the DNN of the schedule machine learning model can be loaded into a DLA memory coupled to the one or more DLAs. The DLA memory can be associated with (e.g., reserved for) one or more specific software applications that operate on the host system 120.

For some embodiments, as a software application operates on the host system 120 (e.g., during a profiling run) and accesses a given memory unit of data stored on one of the memory devices 130, 140, the data migration schedule profiler 114 monitors the access count for the given memory unit over successive time intervals (e.g., over a predetermined number of past time intervals) and generates a set (e.g., list) of application time indicators where the monitored access count satisfies one or more conditions. An example condition can include where the monitored access count indicates a significant change (e.g., delta) in access count (e.g., data access frequency). Another example condition can include where based on a history of the monitored access count (e.g., a global data access frequency histogram), it is known that a given memory unit should be migrated to one or the other of the memory devices 130, 140. Alternatively, the profiling runs of the software application can be performed in a simulation rather on the host system 120. By monitoring the access counts of memory units, the data migration schedule profiler 114 can generate training data or a profile (e.g., a data access count or data access frequency profile) for the software application. Accordingly, the training data can comprise a set of application time indicators for a given memory unit. In particular, using the set of application time indicators for a given memory unit, the data migration schedule profiler 114 can cause the schedule machine learning model (e.g., DNN thereof) to be trained to recognize a sequence of time intervals between access count (e.g., data access frequency) changes for the given memory unit. This can be performed with respect to each memory unit of data accessed by the software application (e.g., during a profile run). This can contrast a machine learning model (e.g., page predictor) that is trained to recognize actual access levels (e.g., hotness levels) of the given memory unit in a next time interval. More regarding training of a schedule machine learning model is described and illustrated with respect to FIG. 6.

As described herein, an access count machine learning model (e.g., page predictor), which is separate from the schedule machine learning model, can be used to generate an access count prediction for a given memory unit of data. The access count machine learning model can comprise a DNN. For some embodiments, the access count machine learning model is trained based on a set of access counts (e.g., data access frequencies) captured over successive time intervals (e.g., a predetermined number of past time intervals) for each memory unit of data accessed by a software application during the software application's operation. Additionally, for some embodiments, the training data used for the access count machine learning model can be pre-filtered prior to being used for training. For instance, the training data can be prefiltered to discard one or more memory units (e.g., all pages) that each have less than a threshold access level (e.g., the threshold hotness level), where the one or more memory units may not be very impactful on the overall performance of the memory sub-system 110. As described herein, for a given memory unit of data stored on one of the memory devices 130, 140, the schedule machine learning model can be used to generate a time prediction that describes when migration of the given memory unit between the memory device 130, 140 should be considered, and that migration consideration can be performed based on a predicted access count (generated by using the access count machine learning model) for the given memory unit for a future time interval. By using the schedule machine learning (e.g., schedule predictor) and the access count machine learning model (e.g., page predictor) in this manner, some embodiments can reduce the rate at which the access count machine learning model is invoked and used, which in turn can reduce the amount of resources (e.g., DLAs and DLA memory) used on the memory sub-system 110. According to some embodiments, the use of the access count machine learning model to generate a predicted access count, for a given memory unit of data, can be more resource intensive (e.g., used more DLA resources) than the use of the schedule machine learning model to generate a time prediction for the given memory unit. Additionally, by using the schedule machine learning (e.g., schedule predictor) and the access count machine learning model (e.g., page predictor) as described herein, the schedule machine learning model can be used to spread out the use of the access count machine learning model at a steadier rate so that resources of the memory sub-system 110 (e.g., DLAs and DLA memory) can keep up with requests for access count predictions (e.g., which can be maintained in a queue) while making timely migration decisions while such decisions still matter (e.g., before a migration decision based on a predicted access count is rendered less than useful).

The ML-based data migration controller 113 can dynamically adjust (e.g., perform dynamic schedule correction of) time predictions generated by the schedule machine learning model for one or more memory units of data, and the dynamic adjustments (e.g., dynamic corrections) can occur via a retraining process (e.g., the original training process with different data) of the schedule machine learning machine or via a simple correction logic. For some embodiments, the one or more dynamic adjustments can be performed while the schedule machine learning model is still in use by the memory sub-system 110 (e.g., online re-training of the schedule machine learning model by the memory sub-system 110), thereby dynamically adapting the schedule machine learning model in real-time to a current workload for which the one or more memory units are being used. The dynamic adjustment can be performed, for example, if and when a different dataset or a different workload is being run by a software application on the host system 120 that is accessing the one or more memory units. To enable the ML-based data migration controller 113 to dynamically adjust the schedule machine learning model, the ML-based data migration controller 113 can record predicted access counts (generated by the access count machine learning model) for memory units of data and can subsequently record actual (observed) access counts for the memory units. If the ML-based data migration controller 113 determines whether a ratio or difference between the predicted and actual access counts for a given memory unit exceeds a threshold value and the absolute access count is considered significant (e.g., exceeds another threshold value), the ML-based data migration controller 113 can add the given memory unit to a list (e.g., queue) of memory units of data that need dynamic adjustment (e.g., online re-training) with respect to the access count machine learning model. Where the access count machine learning model comprises a DNN, this dynamic adjustment (e.g., retraining process) can comprise DNN transfer learning. Alternatively, if the ML-based data migration controller 113 determines that a ratio or difference between the predicted and actual access counts for a given memory unit exceeds a threshold value and the absolute access count is considered significant (e.g., exceeds another threshold value), the ML-based data migration controller 113 can record a memory address (e.g., logical memory address) corresponding to the given memory unit and send the recorded memory address to a conventional predictor.

FIGS. 2 through 5 are flow diagrams of example methods for using machine learning to predict a schedule for migrating data between memory devices, in accordance with some embodiments of the present disclosure. The methods 200, 300, 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 200, 300, 400 is performed by the memory sub-system 110 of FIG. 1 based on the ML-based data migration controller 113. Additionally, or alternatively, for some embodiments, at least one of the methods 200, 300, 400 is performed, at least in part, by the local media controller 135 of the memory device 130 of FIG. 1. For some embodiments, at least method 500 is performed by the host system 120 based on the data migration schedule profiler 114. The illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 2:
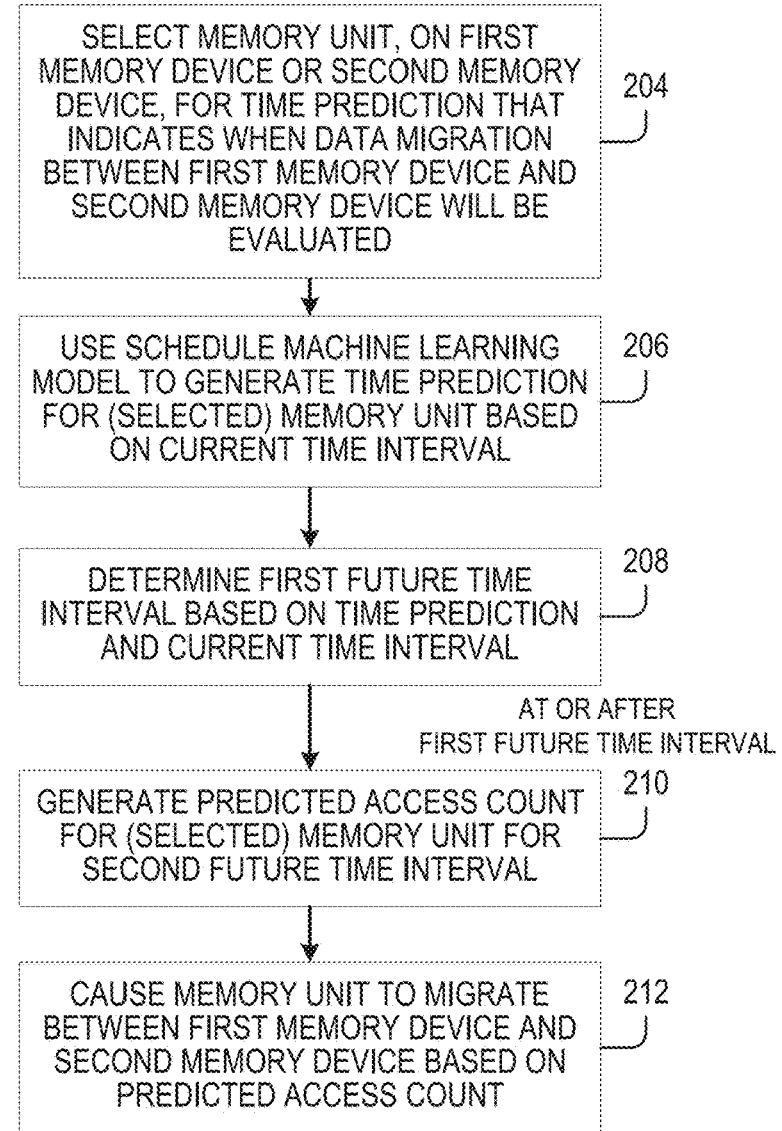
FIGS. 2 through 5 are flow diagrams of example methods for using machine learning to predict a schedule for migrating data, in accordance with some embodiments of the present disclosure.

Referring now to the method 200 of FIG. 2, the method 200 illustrates an example of migrating a memory unit of data between memory devices based on a time prediction by a schedule machine learning model. At operation 204, a controller (e.g., the ML-based data migration controller 113) of a memory sub-system (e.g., 110) selects a memory unit of data, stored on one of a first memory device (e.g., 130) or a second memory device (e.g., 140) of a the memory sub-system, for a time prediction, where the time prediction indicates (e.g., describes) when the data migration controller will evaluate migrating the memory unit between the first memory device and the second memory device. The first memory device can be a first memory type, and the second memory device can be a second memory type that is different from the first memory type. Depending on the embodiment, the first memory device can be associated with a first memory tier, and the second memory device can be associated with a second memory tier. For some embodiments, the first memory device provides faster performance (e.g., lower data access latency or higher bandwidth) than the second memory device. For instance, the first memory device can operate as a cache, while the second memory device can operate as a long term data storage. For some embodiments, the memory unit is selected based on the memory unit satisfying a condition. For instance, the condition can be that the memory unit does not currently have a pending request (in a request queue) for an access count prediction by the access count machine learning model. In another instance, the condition can be that a certain amount of time (e.g., based on the last time prediction generated for the memory unit) has transpired since a last time prediction was generated for the memory unit by the schedule machine learning model.

During operation 206, the controller (e.g., 113) uses a schedule machine learning model to generate the time prediction for the memory unit. For some embodiments, the time prediction corresponds to a time interval when a significant change in anticipated access count, for the memory unit, is expected to occur. Additionally, for some embodiments, the time prediction comprises a delta time, which can indicate a future (upcoming) time interval relative to a current time interval when the time prediction was generated. In this way, the time prediction can define the future time interval when the schedule machine learning model predicts a relevant change in access count for the memory unit is expected to occur. Between two successive time intervals, a change in access count can be considered significant where the change exceeds a predetermined threshold value or represents a certain percentage of change compared to the current access count. As described herein, the schedule machine learning model can comprise a DNN. For some embodiments, the schedule machine learning model is trained by a host system (e.g., 120) and provided to the memory sub-system after training. For instance, the schedule machine learning model can be trained by the host system (e.g., 120) using a monitoring process, where the monitoring process profiles data access of a plurality of memory units of data stored on the memory sub-system (e.g., 110) by a software application operating on the host system. To use the schedule machine learning model, the memory sub-system can load the schedule machine learning model on local memory of the memory sub-system (e.g., 110) that is coupled to the controller and can operate the schedule machine learning model using one or more machine learning hardware accelerators (e.g., DLAs) of the memory sub-system 110 coupled to the local memory.

Subsequently, at operation 208, the controller (e.g., 113) determines a first future time interval based on the time prediction (e.g., delta time) generated for the memory unit during operation 206. At or after the first future time interface determined by operation 208, at operation 210, the controller (e.g., 113) generates a predicted access count for the memory unit for a second future time interval that comes after the first future time interval (e.g., a next time interval that follows a current time interval). For some embodiments, the predicted access count indicates whether the memory unit will be accessed frequently (e.g., whether access level of the memory unit is "hot") at the second future time interval (e.g., the next time interval). Additionally, for some embodiments, the predicted access count is generated based on a history of access counts for the memory unit over a plurality of past time intervals. This can be done for each relevant memory unit. For some embodiments, the predicted access count is generated using an access count machine learning model based on the history of access counts of the memory unit over the plurality of past time intervals. As described herein, the access count machine learning model can comprise a deep-neural network (DNN), which is different from one used for the schedule machine learning model. Additionally, the access count machine learning model can be trained based on a history of access counts for the memory unit over a plurality of past time intervals. This can be done for each relevant memory unit.

For some embodiments, use of the access count machine learning model on the memory sub-system (e.g., 110) involves operating the access count machine learning model by one or more hardware resources (e.g., one or more hardware accelerators, such as DLAs, and associated memory) of the memory sub-system (e.g., 110). To manage use of the resources, the memory sub-system (e.g., 110) can implement and maintain a queue for requests to generate time predictions for various memory units using the access count machine learning model. Accordingly, for some embodiments, the predicted access count (for the memory unit for the second future time interval) is generated at operation 210 by adding, to a queue for using the access count machine learning model, a new request to generate the predicted access count. For instance, an entry can be added to the queue for the new request, and the new (queue) entry can indicate that the predicted access count is requesting to be fulfilled by the second future time interval. An entry for an individual request can indicate when the individual request is requested to be fulfilled (e.g., deadline by which the predicted access count is requested). Additionally, an entry for an individual request can comprise a memory unit signature (e.g., block signature) to uniquely or semi-uniquely identify the memory unit. For instance, a memory unit signature for a given memory unit of data can comprise a plurality of attributes of the given memory unit, such as one or more of the following: a current memory address (e.g., current logical or physical memory address) corresponding to the given memory unit; a program counter for the given memory unit; a load instruction that first accessed the given memory unit; a read or write flag for the given memory unit; an indication of whether the given memory unit is prefetched; a process identifier associated with the given memory address; a sequence of cache line addresses for the given memory unit; and a spatial line bitmask for the given memory unit. Eventually, an individual request is selected from the queue, for processing using the access count machine learning model, based on a priority of the individual request. Depending on the embodiment, the priority of an individual request can be determined in different ways. For instance, requests (for time predictions) for memory units can be prioritized based on the amount of access count change last observed for those memory units. In another instance, requests (for time predictions) for memory units can be prioritized based on when the requests are requested to be fulfilled (e.g., deadline by which the predicted access count is requested).

At operation 212, the controller (e.g., 113) causes the memory unit to migrate between the first memory device (e.g., 130) and the second memory device (e.g., 140) based on the predicted access count generated by operation 210. For instance, where the first memory device (e.g., 130) provides faster data access than the second memory device (e.g., 140), when the predicted access count indicates that the memory unit is frequently accessed (e.g., access frequency or access level of the memory unit is above a threshold value, such as a data hotness threshold value), the memory unit can be migrated (e.g., moved) from the second memory device to the first memory device. When the predicted access count indicates that the memory unit is not frequently accessed (e.g., access frequency or access level of the memory unit is below the threshold value), the memory unit can be migrated (e.g., moved) from the first memory device to the second memory device.

Figure 3:
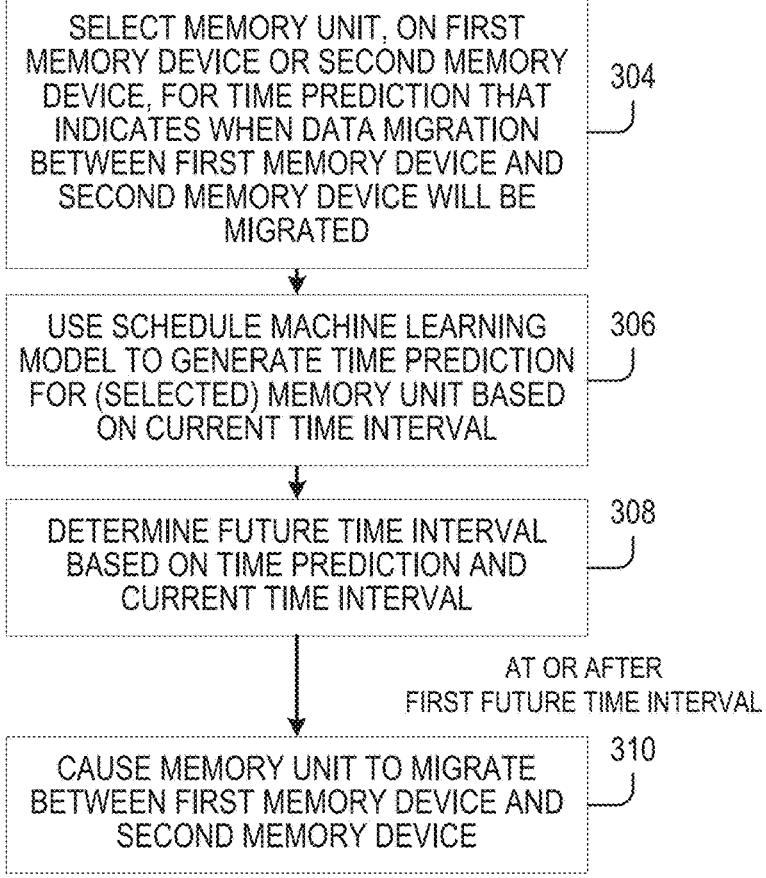

Referring now to the method 300 of FIG. 3, the method 300 illustrates an example of migrating a memory unit of data between memory devices based on a time prediction by a schedule machine learning model. Operations 304, 306, 308 of the method 300 are respectively similar to operations 204, 206, 208 of the method 200 of FIG. 2. At operation 310, the controller (e.g., 113) causes the memory unit of data to migrate between the first memory device (e.g., 130) and the second memory device (e.g., 140). For example, if the memory unit is currently stored on the first memory device, during operation 310, the controller can cause the memory unit to be migrated to the second memory device. Alternatively, if the memory unit is currently stored on the second memory device, during operation 310, the controller can cause the memory unit to be migrated to the first memory device. Operation 310 represents an example of where an embodiment does not use a predicted access count, generated by an access count machine learning model, to cause migration of the memory unit between the first memory device and the second memory device. Unlike operation 212, for operation 310, the controller assumes that it is enough to cause migration of the memory unit between the first and second memory devices at a time prediction (of when a significant change in access count for the memory unit is expected/anticipated).

Figure 4:
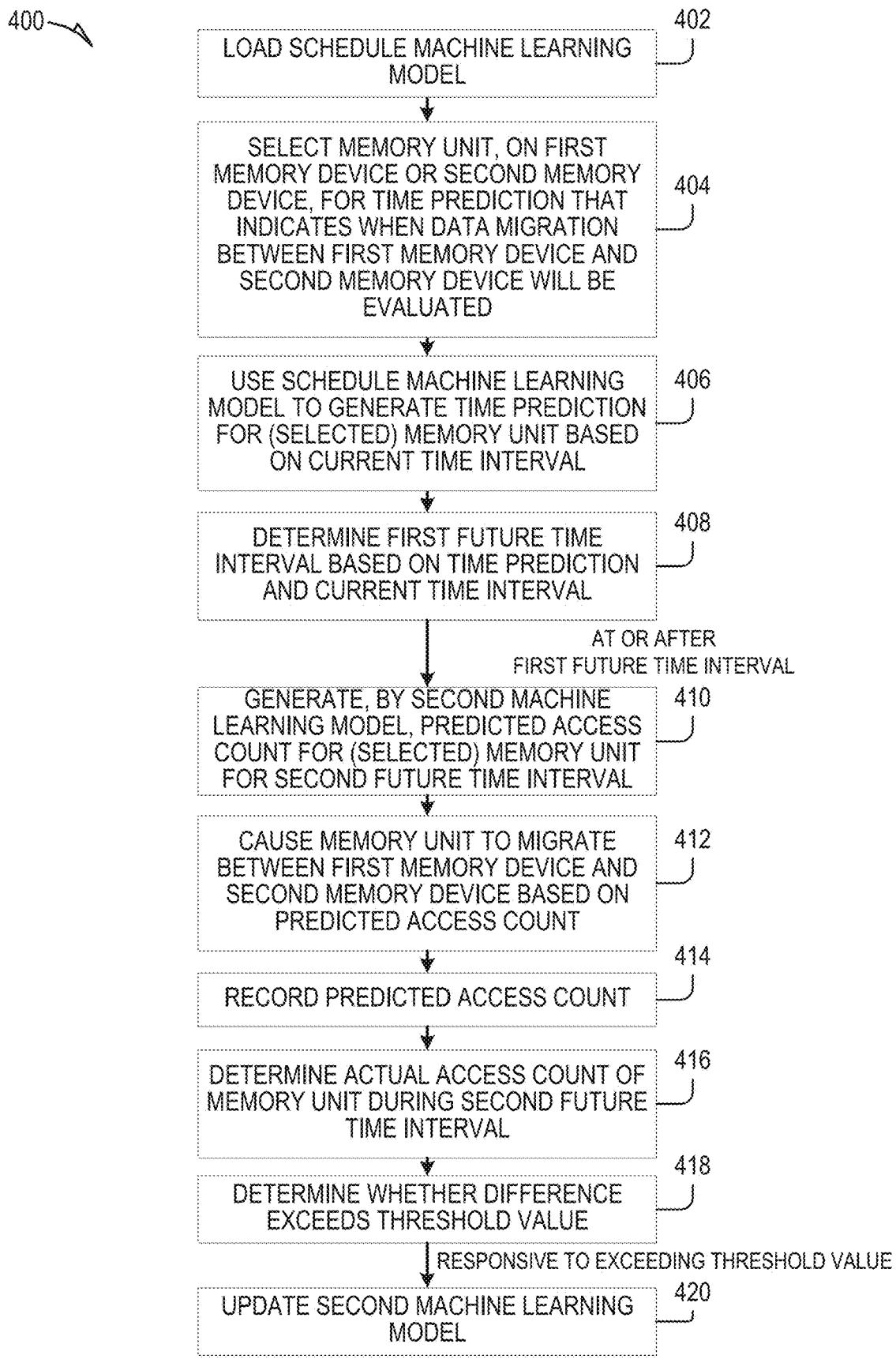

Referring now to the method 400 of FIG. 4, the method 400 illustrates an example of migrating a memory unit of data between memory devices based on a time prediction by a schedule machine learning model. At operation 402, a controller (e.g., the ML-based data migration controller 113) of the memory sub-system loads a schedule machine learning model for use by the memory sub-system. As described herein, to use the schedule machine learning model, the controller (e.g., 113) can load the schedule machine learning model on local memory of the memory sub-system (e.g., 110) that is coupled to the controller, and can operate the schedule machine learning model using one or more machine learning hardware accelerators (e.g., DLAs) of the memory sub-system 110 coupled to the local memory. As also described herein, the schedule machine learning model can be trained by a host system (e.g., 120) and subsequently provided to the memory sub-system (e.g., 110) so that it can load and use the schedule machine learning model.

For some embodiments, operations 404, 406, 408, 410, 412 are respectively similar to operations 204, 206, 208, 210, 212 of the method 200 of FIG. 2.

At operation 414, the controller (e.g., 113) records (e.g., stores) the predicted access count (for the memory unit for the second future time interval) generated during operation 410. The controller (e.g., 113), at operation 416, determines (e.g., via monitoring and recording) an actual access count of the memory unit observed by the controller during the second future time interval. Thereafter, at operation 418, the controller (e.g., 113) determines whether a difference between the predicted access count and the actual access count exceeds a threshold value. For some embodiments, the threshold value is used to determine whether the difference (between the predicted access count and the actual access count) is sufficient to warrant an update (e.g., adjustment or correction) of the access count machine learning model in view of the difference (e.g., determine whether the predicted access count is sufficiently inaccurate). In response to the difference exceeding the threshold value, at operation 420, the controller (e.g., 113) causes the access count machine learning model to be update by a training process that updates one or more weights or parameters of the access count machine learning model.

During operation 420, the controller (e.g., 113) can dynamically adjust (e.g., perform dynamic schedule correction of) time predictions generated by the schedule machine learning model for the memory unit, and the dynamic adjustments (e.g., dynamic corrections) can occur via a retraining process (e.g., the original training process with different data) of the schedule machine learning machine or via a simple correction logic. For some embodiments, this dynamic adjustment can be performed while the schedule machine learning model is still in use by the memory sub-system 110 (e.g., online re-training of the schedule machine learning model by the memory sub-system 110), thereby dynamically adapting the schedule machine learning model in real-time to a current workload for which the one or more memory units are being used. As described herein, operation 414 can record predicted access counts (generated by the access count machine learning model) for the memory unit and operation 416 can record actual (observed) access counts for the memory unit. At operation 418, the controller (e.g., 113) determines whether a ratio or difference between the predicted and actual access counts for a given memory unit exceeds a threshold value and the absolute access count is considered significant (e.g., exceeds another threshold value). If so, during operation 420, the controller (e.g., 113) can add the memory unit to a list (e.g., queue) of memory units of data that need dynamic adjustment (e.g., online re-training) with respect to the access count machine learning model. As described herein, where the access count machine learning model comprises a DNN, this dynamic adjustment (e.g., retraining process) can comprise DNN transfer learning. Alternatively, if the controller (e.g., 113) determines that a ratio or difference between the predicted and actual access counts for the memory unit exceeds a threshold value and the absolute access count is considered significant (e.g., exceeds another threshold value), the controller can record a memory address (e.g., logical memory address) corresponding to the memory unit and send the recorded memory address to a conventional predictor.

Figure 5:
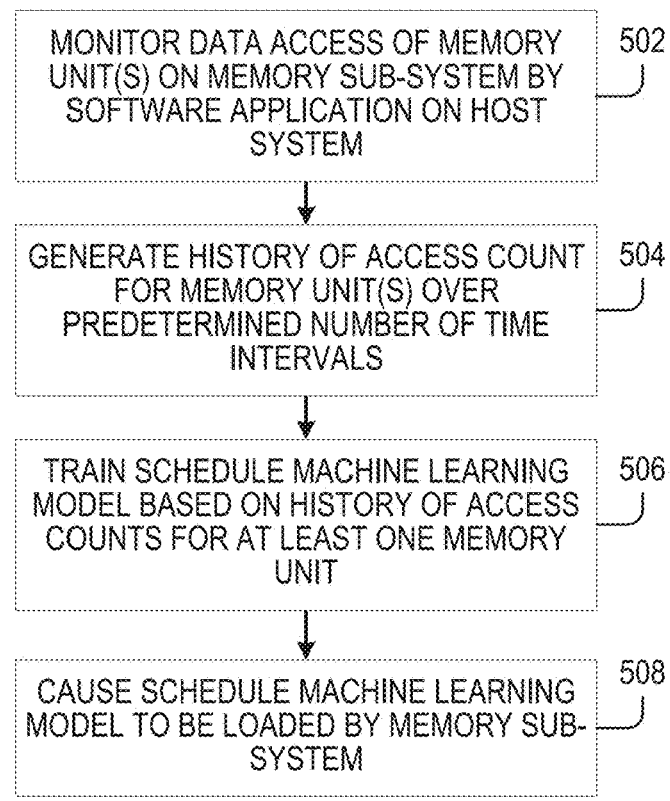

Referring now to the method 500 of FIG. 5, the method 500 illustrates an example of training of a schedule machine learning model that generates time predictions for memory units, in accordance with some embodiments. For various embodiments, the method 500 is performed while the schedule machine learning model is offline (e.g., the schedule machine learning model is not in use by the ML-based data migration controller 113 to generate time predictions for memory units of data).

At operation 502, a processing device (e.g., of the host system 120) monitors data access, by a software application, of a set of memory units of data stored on a memory sub-system (e.g., 110) coupled to a host system (e.g., 120). Operation 502 can be performed while the software application is operating on the host system (e.g., 120), such as while the software application is being operated for a profile run. During operation 502, actual access counts for the set of memory units is monitored (e.g., measured or observed) over a predetermined number of time intervals (e.g., N number of time intervals).

Based on the monitoring of the data access by operation 502, at operation 504, the processing device (e.g., of the host system 120) generates a history of access counts for each memory unit in the set of memory units over a predetermined number of time intervals. By operation 504, the monitored data access can be recorded for training the schedule machine learning model.

At operation 506, the processing device (e.g., of the host system 120) trains the schedule machine learning model based on the history of access counts for at least one memory unit of the set of memory units. During operation 506, the processing device can configure the schedule machine learning model to generate a time prediction for the at least one memory unit as described herein. By operation 506, the schedule machine learning model can learn a pattern of access count changes for the at least one memory unit (e.g., can learn data access frequency behavior of the software application with respect to the schedule machine learning model) and detect when a significant change (e.g., 10%) to the access count (for the at least one memory unit) occurs between two successive time intervals. In this way, the schedule machine learning model can learn a number of time intervals (e.g., epochs) between significant access count (e.g., data access frequency) changes. For instance, based on the history of access counts, the training process can determine that an access count of the at least one memory unit changes significantly five time intervals (e.g., epochs) from where the predetermined number of time intervals ends. As described herein, the time prediction can indicate when the memory sub-system (e.g., 110) will evaluate migrating the individual memory unit between a first memory device (e.g., 130) of the memory sub-system and a second memory device (e.g., 140) of the memory sub-system. During operation 506, one or more weights or parameters of the schedule machine learning model (e.g., the DNN thereof) can be generated (e.g., defined or outputted) or adjusted.

Eventually, at operation 508, the processing device (e.g., of the host system 120) causes the schedule machine learning model, resulting from operation 506, to be loaded by the memory sub-system (e.g., 110) for use by the memory sub-system. In this way, the schedule machine learning model can be deployed from the host system (e.g., 120) to the memory sub-system (e.g., 110).

Figure 6:
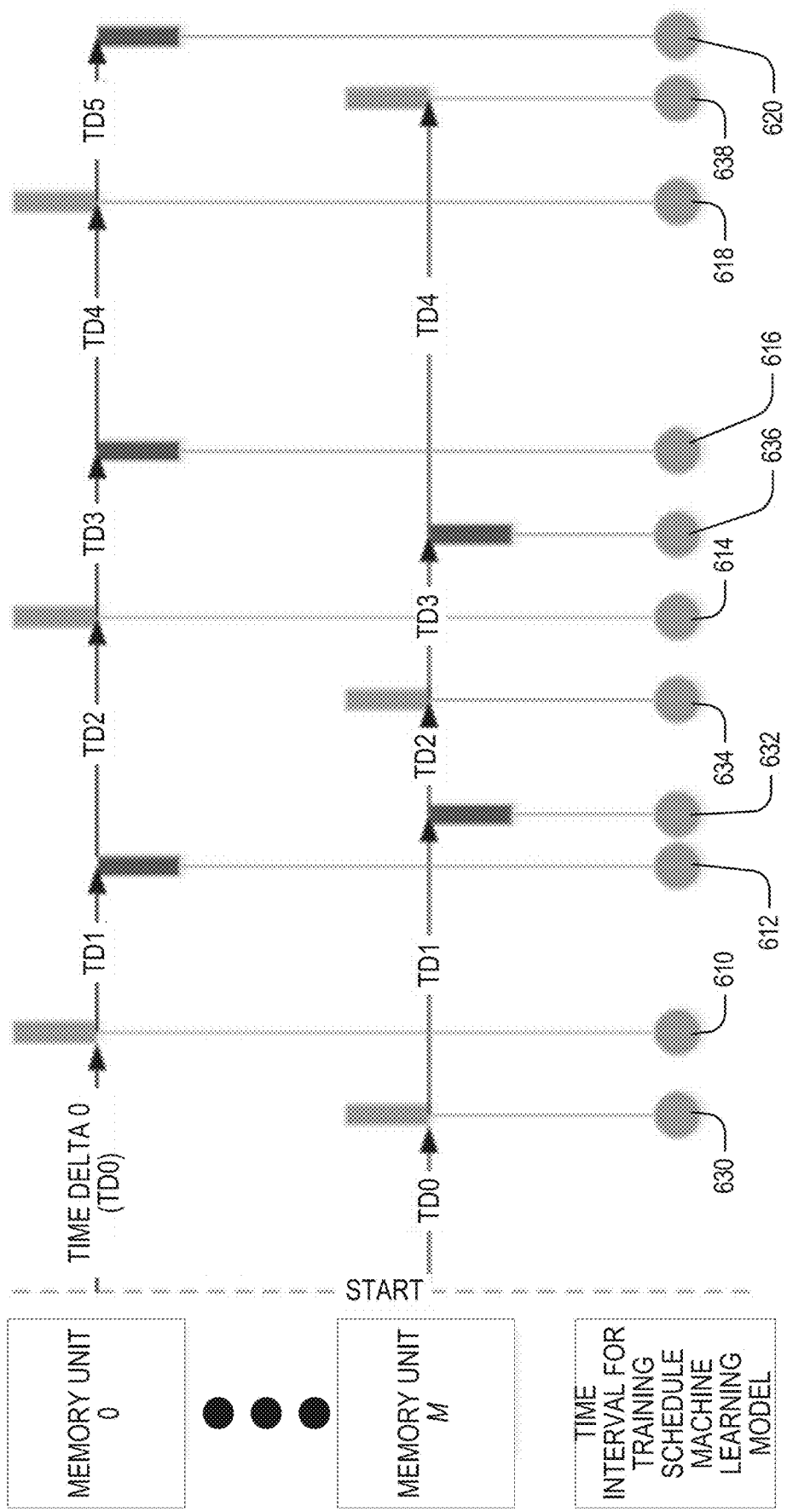
FIG. 6 is a diagram illustrating an example of monitoring memory units for training a schedule machine learning model, according to some embodiments.

FIG. 6 is a diagram illustrating an example of monitoring memory units (e.g., pages) for training a schedule machine learning model, according to some embodiments. The monitoring and training illustrated by FIG. 6 could occur while the schedule machine learning model is online or offline. In FIG. 6, monitoring of memory units 0 through M (of data) are illustrated over a software application's progress in time (e.g., over a series of successive time intervals). For FIG. 6, a first memory device (e.g., 140) represents a faster memory device, while a second memory device (e.g., 130) represents a slower but denser memory device, with a given memory unit of data being stored on the first memory device when the given memory unit is accessed frequently (e.g., the given memory unit of data is hot) and being stored on the second memory device when the given memory unit is not accessed frequently (e.g., the given memory unit of data is cold).

As shown with respect to the memory unit 0, after a time delta 0 (TD0) from the start of monitoring, the memory unit 0 is initially stored on the second memory device (e.g., 140) and, as such, the schedule machine learning model can be trained to anticipate migration of the memory unit 0 at time interval 610. After a TD1, the memory unit 0 migrated from the second memory device to the first memory device (e.g., 130) and, as such, the schedule machine learning model can be trained to anticipate migration of the memory unit 0 at time interval 612. After a TD2, the memory unit 0 migrated from the first memory device to the second memory device and, as such, the schedule machine learning model can be trained to anticipate migration of the memory unit 0 at time interval 614. After a TD3, the memory unit 0 migrated from the second memory device to the first memory device and, as such, the schedule machine learning model can be trained to anticipate migration of the memory unit 0 at time interval 616. After a TD4, the memory unit 0 migrated from the first memory device to the second memory device and, as such, the schedule machine learning model can be trained to anticipate migration of the memory unit 0 at time interval 618. Finally, after a TD5, the memory unit 0 migrated from the second memory device to the first memory device and, as such, the schedule machine learning model can be trained to anticipate migration of the memory unit 0 at time interval 620. Each time delta can be measured in one or more time intervals (e.g., epochs). Additionally, each of the time intervals 610 through 620 can correspond to a time interval where a request for a predicted access count can be requested from an access count machine learning model.

As shown with respect to the memory unit M, similar monitoring can be performed similar to the memory unit 0, and can result in similar training of the schedule machine learning model for time intervals 630, 632, 634, 636, 638.

Figure 7:
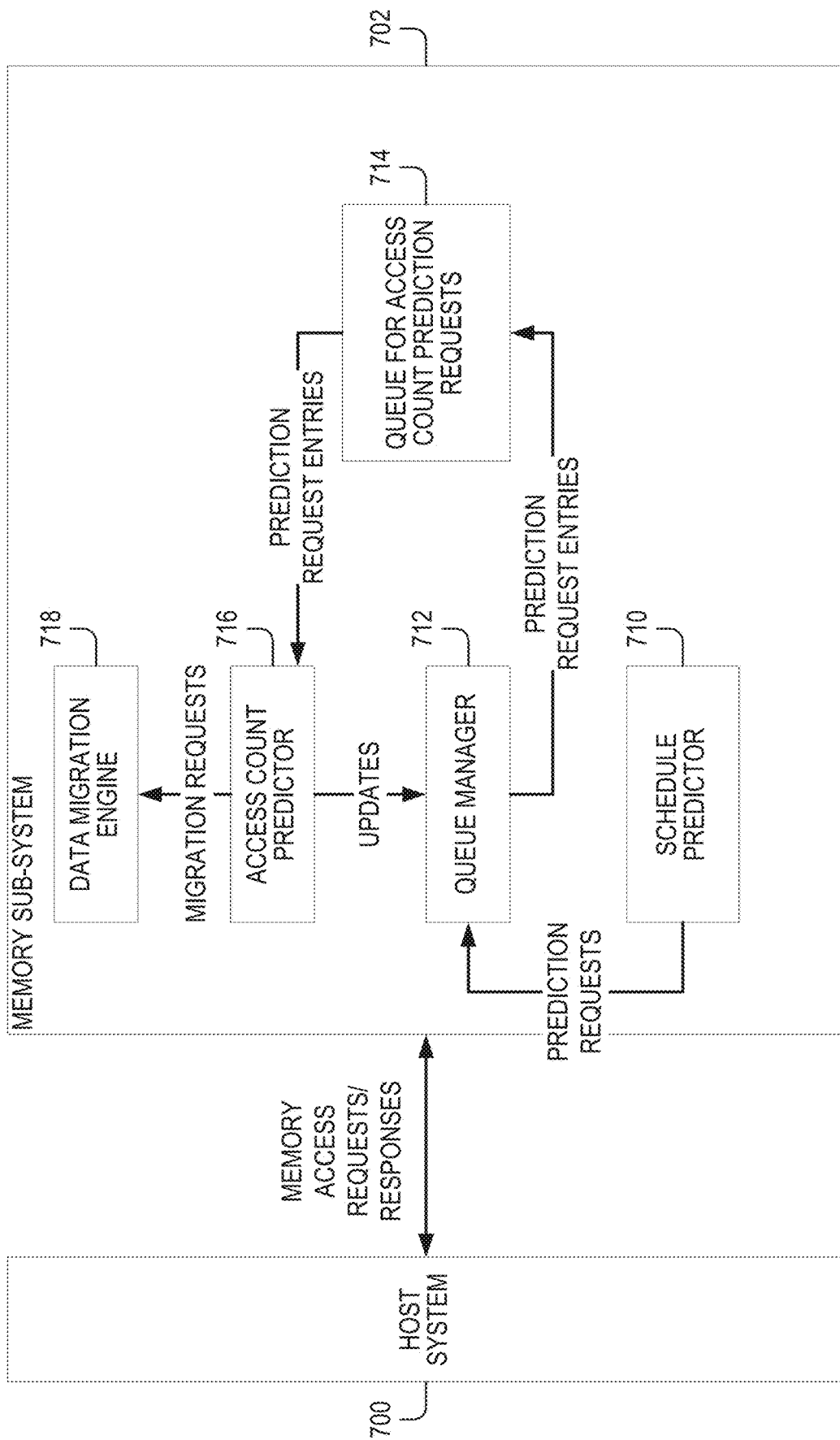
FIG. 7 is a block diagram illustrating an example of queueing requests for an access count machine learning model, according to some embodiments.

FIG. 7 is a block diagram illustrating an example of queueing requests for an access count machine learning model, according to some embodiments. FIG. 7 shows a host system 700 is coupled to a memory sub-system 702, where one or more memory accesses requests and responses are communicated between the host system 700 and the memory sub-system 702. The memory sub-system 702 illustrates an embodiment capable of managing hardware resources of the memory sub-system 702 for operating machine learning models (e.g., a pool of hardware accelerators, such as DLAs), which can be useful when such hardware resources are limited. For instance, either a schedule machine learning model, an access count machine learning model, or both can make use of such hardware resources of the memory sub-system 702. As shown, the memory sub-system 702 comprises a schedule predictor 710, a queue manager 712, a queue 714 for access count prediction requests (e.g., access count predictor task queue), an access count predictor 716, and a data migration engine 718. For some embodiments, the schedule predictor 710 comprises (or makes use of) a schedule machine learning model as described herein, and the access count predictor 716 comprises (or makes use of) an access count machine learning model as described herein. Accordingly, the schedule predictor 710 can be used to generate a time prediction for a memory unit of data of the memory sub-system 702, where the time prediction describes a future time interval when a significant change in access count of the memory unit is expected. Additionally, the access count predictor 716 can generate a predicted access count or a predicted data access level (e.g., hotness level) prediction for a memory unit of the memory sub-system 702, which can determine whether the memory units is stored on a fast memory device of the memory sub-system 702 or a slow memory device of the memory sub-system 702. For instance, if the predicted access count (for a next time interval) for a given memory unit of data exceeds a threshold value, the given memory unit can be migrated to a fast memory device by data migration engine 718, and if the predicted access count (for the next time interval) for the given memory unit of data does not exceed the threshold value, the given memory unit can be migrated to a slow memory device (if not already there) by data migration engine 718.

For some embodiments, the memory sub-system 702 uses the queue 714 (and other components of the memory sub-system 702) to prioritize and service requests for access count predictions, for memory units, using the access count predictor 716. For instance, the memory sub-system 702 can drop requests (for access count predictions) that are expired or low-priority (e.g., the memory sub-system 702 can be lossy with respect to requests), or the memory sub-system 702 can service requests that do not meet timing requirements to a conventional predictor (e.g., a histogram-based predictor), which can ensure accuracy or performance will not be worse than a conventional predictor.

The following Table 1 illustrates example content of the queue 714 when the queue 714 is populated with multiple example requests for access count predictions.

TABLE 1

| Earliest Access Count Prediction | Lag | Memory Unit ID | Next Expected Rate Change | Normalized Rate | Memory Unit Signature |
|---|---|---|---|---|---|
| T + 1 | 4 | A | T − 3L (late request) | 99 | Address, PC, PID |
| T + 2 | 3 | B | T − 1L (late request) | 500 | Address, PC, PID |
| T + 3 | 1 | C | T + 5L | 60 | Address, PC, PID |

TABLE 1-continued

| Earliest Access Count Prediction | Lag | Memory Unit ID | Next Expected Rate Change | Normalized Rate | Memory Unit Signature |
|---|---|---|---|---|---|
| T + 4 | 1 | D | T + 8L | 22 | Address, PC, PID |
| T + 5 | 15 | E | T + 10L | 10 | Address, PC, PID |

The table for the queue 714 assumes a single access count prediction by the access count predictor 716 takes time L, and the current time interval is T. An entry that exceeds a lag threshold can be dropped from the queue 714. Each entry in the queue 714 can be unique to a specific memory unit of data on the memory sub-system 702. Additionally, an entry having higher normal rates can be inserted higher in the queue 714, and can displace entries having lower normal rates. With respect to field values of entries in the queue 714, Table 1 illustrates: Earliest Access Count Prediction can indicate an earliest access count prediction, for a memory unit associated with the request entry, can be submitted to and generated by the access count predictor 716; Lag can indicate how long the entry has remained in the queue 714; Memory Unit Identifier (ID) (e.g., block ID or page ID) can represent an identifier that uniquely or semi-uniquely identifies a memory unit associated with the request entry; Next Expected Rate Change can indicate when to expect a next significant change to an access count of a memory unit associated with the request entry (which can indicate how much time remains to have the request for predicted access count fulfilled, or how late the predicted access count is to be fulfilled); Normalized Rate can indicate a normalized access count last observed or predicted for a memory unit associated with the request entry; and Memory Unit Signature can comprise an identifier formed by a combination of two or more attributes of a memory unit associated with the request entry. According to some embodiments, entry requests in the queue 714 can be ordered/prioritized based on the Normalized Rate and then the Next Expected Rate Change.

During operation, the schedule predictor 710 can generate one or more access count prediction requests for one or more memory units of data accessed (via memory access requests and responses) by a software application operating on the host system 700. The queue manager 712 can receive the one or more access count prediction requests and can add one or more prediction request entries to the queue 714. Eventually, the access count predictor 716 can service one or more access count requests described by entries of the queue 714. The access count predictor 716 can generate predicted access counts for memory units of data and, based on the predicted access counts, generate migration requests (e.g., with a source and destination) to the data migration engine 718 for migrating memory units between the fast memory device and the slow memory device. Additionally, the access count predictor 716 can generate update data based on the predicted access counts and provide the update data to the queue manager 712, which can used the update data (e.g., updated Normalized Rate, where memory unit is migrated, etc.).

As described herein, if the memory sub-system 702 is configured to use the schedule predictor 710 alone, an access count prediction request generated (based on a time prediction generated by the schedule predictor 710) can immediately trigger a migration of a given memory unit of data between two memory devices. If the memory sub-system 702 is configured to use the schedule predictor 710 and the access count predictor 716, an access count prediction request generated (based on a time prediction generated by the schedule predictor 710) can cause the access count predictor 716 to generate a predicted access count/data access level for a given memory unit of data. The predicted access count/data access level can determine a predicted hotness level of the given memory unit and, depending on where the predicted hotness level ranks among all other memory units of data (e.g., in hotness order), the given memory unit can be placed on the faster or slower memory device. For some embodiments, an entry of the queue 714 can be dropped (and can be sent to a heuristic-based predictor) in response to: the entry is displaced for another entry associated with a higher priority access count prediction request; the time when the access count request can be serviced exceeds a "lateness" threshold value and is determined to no longer be useful as a result; or if there is not enough hardware resources (e.g., DLAs) to operate the access count predictor 716.

Figure 8:
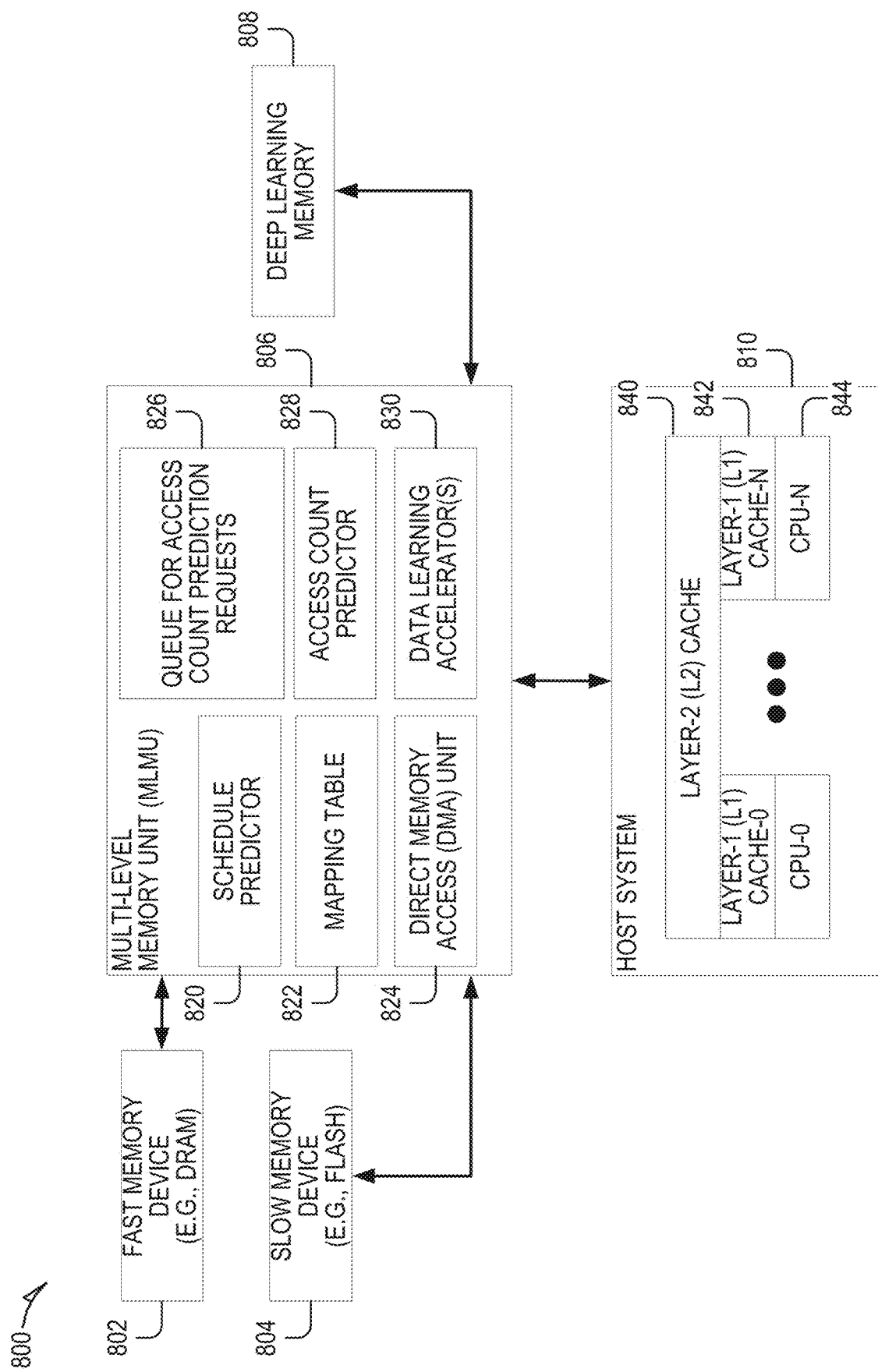
FIG. 8 is block diagram of an example system implementing use of machine learning to predict a schedule for migrating data, according to some embodiments.

FIG. 8 is block diagram of an example system 800 implementing use of machine learning to predict a schedule for migrating data, according to some embodiments. As shown, the system 800 comprises a host system 810 coupled to a multi-level memory unit (MLMU) 806, which is coupled to a fast memory device 802 (e.g., DRAM), a slow memory device 804 (e.g., NAND-type memory device), and deep learning memory 808. The host system 810 comprises a layer-2 (L2) cache 840, and a plurality of layer-1 (L1) caches 842 corresponding to individual central processing units (CPUs) 844 of the host system 810. As also shown, the MLMU 806 comprises a schedule predictor 820, a mapping table 822, a direct memory access (DMA) unit 824, a queue 826 for access count prediction requests, an access count predictor 828, and one or more DLAs 830. The DLAs 830 and the deep learning memory 808 represent a pool of hardware resources for operating the schedule predictor 820, the access count predictor 828, or both. The access count predictor 828 can be driven by prioritized requests for predicted access counts from the queue 826. The requests in the queue 826 can be driven by time predictions generated by the schedule predictor 820. The mapping table 822 can keep track of which of the memory devices 802, 804 each memory unit (e.g., page or block) is stored on. The DMA unit 824 can facilitate migration of a memory unit between the fast memory device 802 and the slow memory device 804.

Figure 9A:
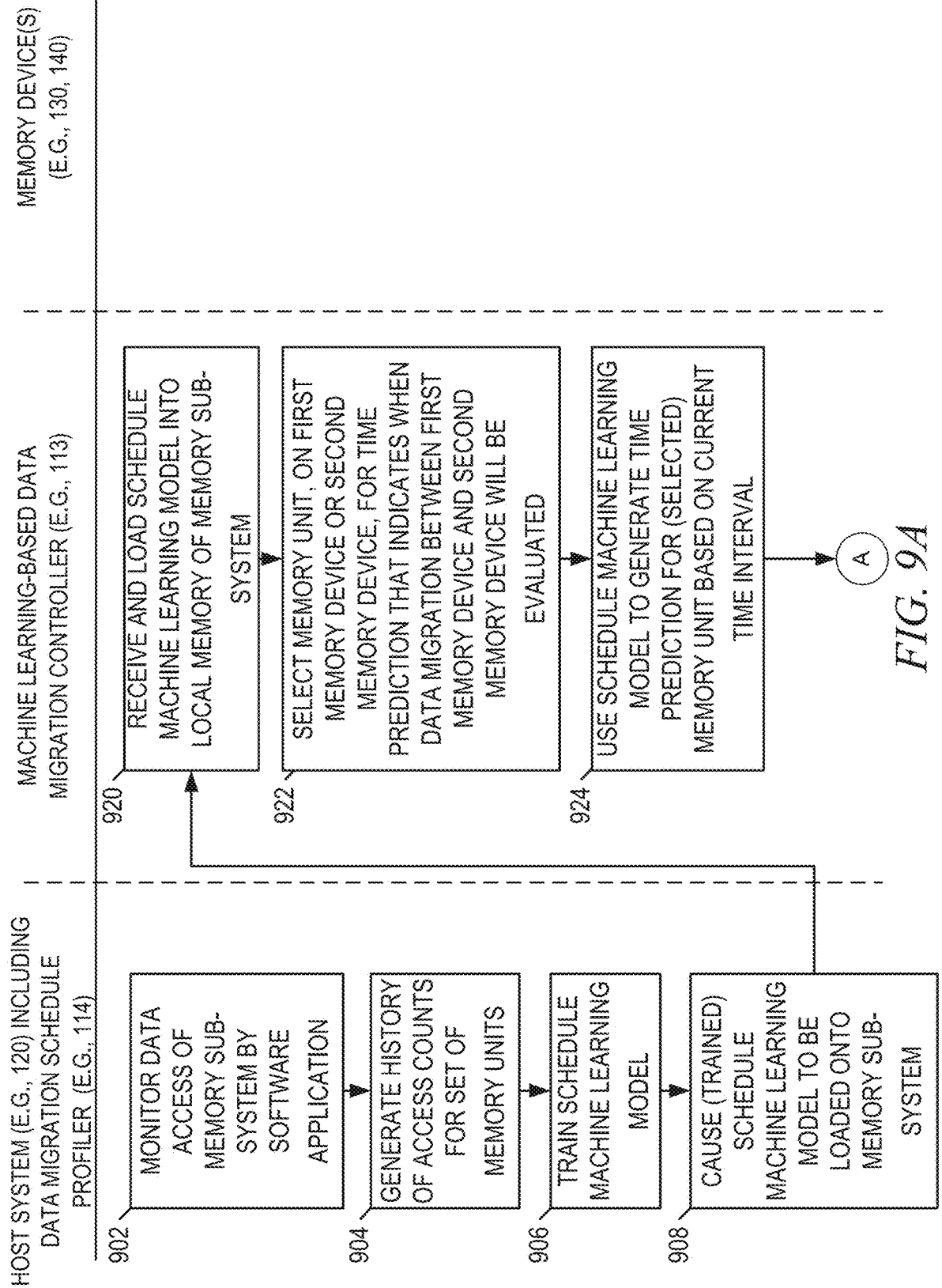
FIGS. 9A and 9B provide a diagram illustrating interactions between components of a computing environment in the context of some embodiments in which a method for using machine learning to predict a schedule for migrating data as described herein is performed.
Figure 9B:
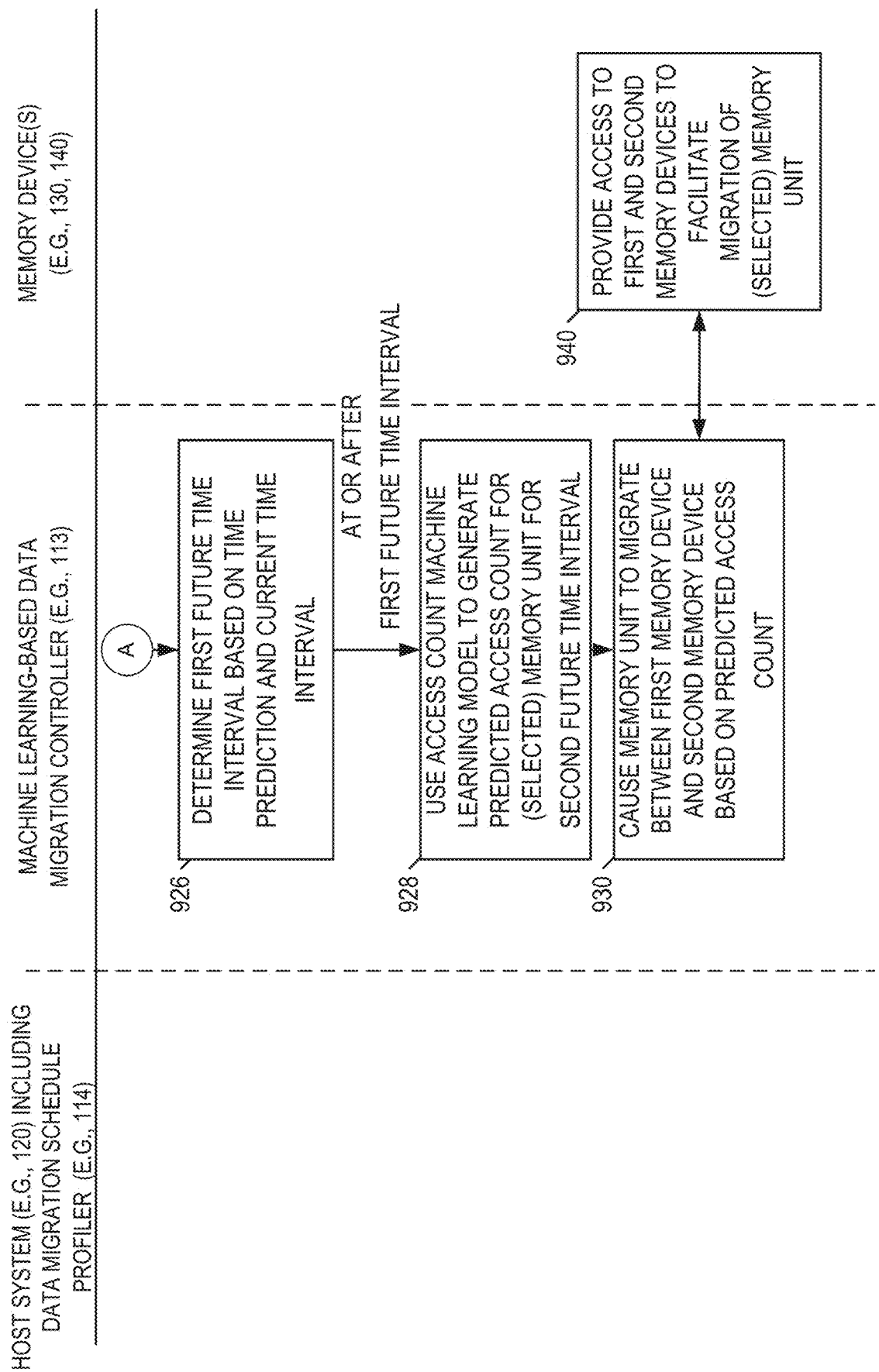

FIGS. 9A and 9B provide a diagram illustrating interactions between components of a computing environment in the context of some embodiments in which a method for using machine learning to predict a schedule for migrating data as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120) that includes a data migration schedule profiler (e.g., 114), a machine learning-based data migration controller (e.g., 113), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 9, the host system can include the host system 120, the data migration schedule profiler can include the data migration schedule profiler 114, and the machine learning-based data migration controller can include the ML-based data migration controller 113, and the memory device can include the memory devices 130, 140.

As shown in FIG. 9, at operation 902, a hardware processor of the host system 120 monitors data access of the memory sub-system 110 by a software application operating on the host system 120. At operation 904, the hardware processor of the host system 120 generates a history of access counts for a set of memory units of data stored on one of the memory devices 130, 140. Based on the history of access counts for the set of memory units, at operation 906, the hardware processor of the host system 120 trains a schedule machine learning model to generate time predictions for the set of memory units. Subsequently, at operation 908, the hardware processor of the host system 120 causes the (trained) schedule machine learning model to be loaded on the memory sub-system 110 (e.g., loaded on DLA memory so that is can be operated by one or more DLAs).

On the memory sub-system 110, at operation 920, the ML-based data migration controller 113 receives and loads the (trained) schedule machine learning model into local memory (e.g., operational memory) of the memory sub-system 110. At operation 922, the ML-based data migration controller 113 selects a memory unit of data, stored on a first memory device (e.g., 130) or a second memory device (e.g., 140), for a time prediction that indicates when data migration between the first and second memory devices will be evaluated by the ML-based data migration controller 113. Subsequently, at operation 924, the ML-based data migration controller 113 uses the schedule machine learning model to generate the time prediction for the (selected) memory unit based on a current time interval.

Referring now to FIG. 9B, at operation 926, the ML-based data migration controller 113 determines a first future time interval based on the time prediction (generated at operation 924) and the current time interval. At or after the first time interval has occurred, at operation 928, the ML-based data migration controller 113 uses an access count machine learning model to generate a predicted access count for the (selected) memory unit for a second future time interval (e.g., next time interval). Based on the predicted access count generated at operation 928, at operation 930, the ML-based data migration controller 113 causes the memory unit to migrate between the first memory device (e.g., 130) and the second memory device (e.g., 140). In response, at operation 940, the memory devices 130, 140 provides the ML-based data migration controller 113 with access to the memory unit to facilitate migration of the memory unit.

Figure 10:
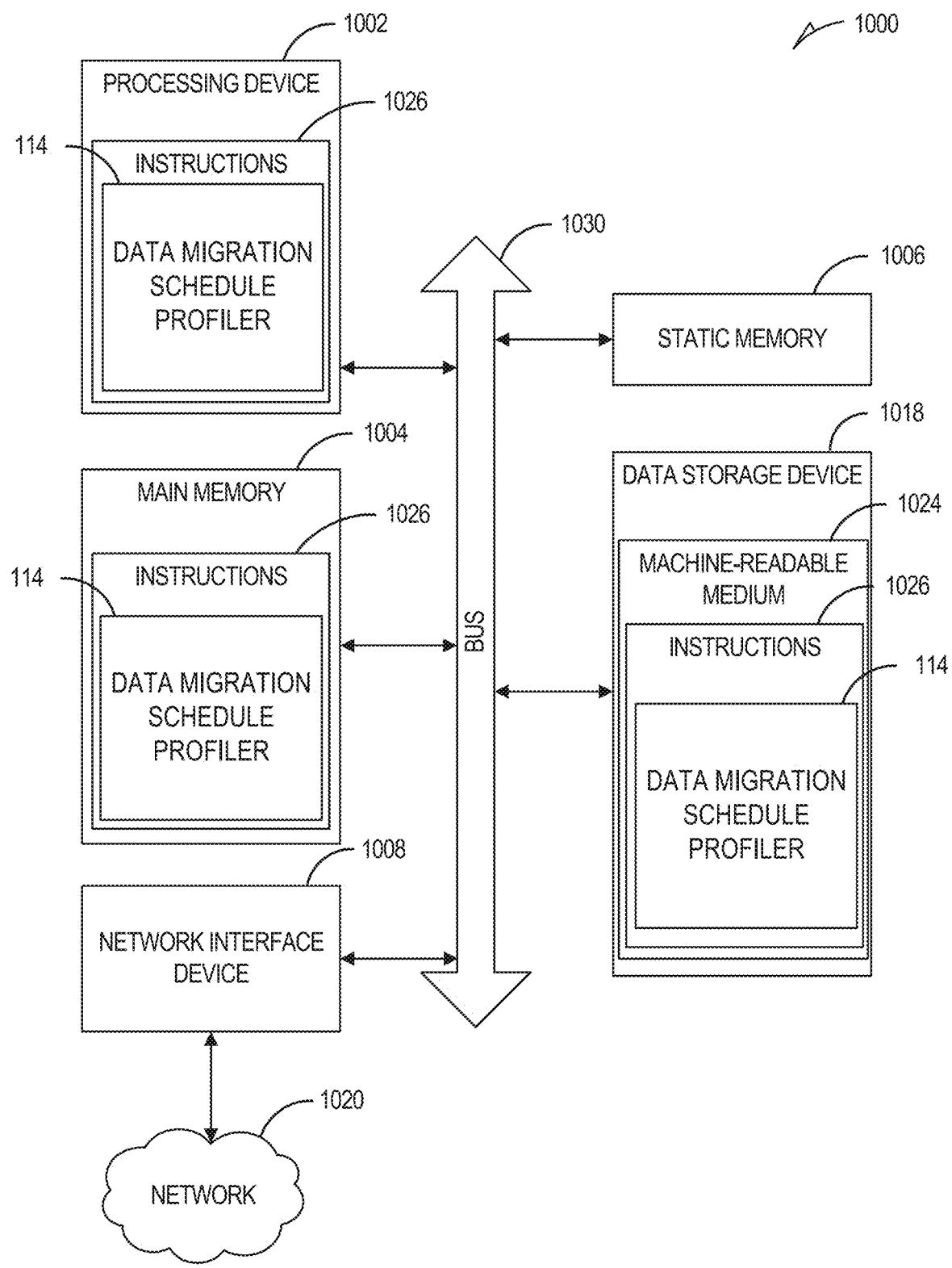
FIG. 10 is a block diagram of an example computer system in which embodiments of the present disclosure may operate.

FIG. 10 illustrates an example machine in the form of a computer system 1000 within which a set of instructions can be executed for causing the machine to perform any one or more of the methodologies discussed herein. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., ROM, flash memory, DRAM such as SDRAM or Rambus DRAM (RDRAM), etc.), a static memory 1006 (e.g., flash memory, static random access memory (SRAM), etc.), and a data storage device 1018, which communicate with each other via a bus 1030. The bus 1030 can be based on, for example, a CXL, a Gen-Z, an OpenCAPI, or a PCI-express interface protocol.

The processing device 1002 represents one or more general-purpose processing devices such as a microprocessor, a central processing unit, or the like. More particularly, the processing device 1002 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1002 can also be one or more special-purpose processing devices such as an ASIC, a FPGA, a digital signal processor (DSP), a network processor, or the like. The processing device 1002 is configured to execute instructions 1026 for performing the operations and steps discussed herein. The computer system 1000 can further include a network interface device 1008 to communicate over a network 1020.

The data storage device 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, with the main memory 1004 and the processing device 1002 also constituting machine-readable storage media. The machine-readable storage medium 1024, data storage device 1018, and/or main memory 1004 can correspond to the memory sub-system 110 of FIG. 1.

In one embodiment, the instructions 1026 include instructions to implement functionality corresponding to training a schedule machine learning model for predicting a time for migrating data between memory devices as described herein (e.g., the data migration schedule profiler 114 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and the like.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a first memory device of a first memory type;
a second memory device of a second memory type; and
a data migration controller operatively coupled to the first and the second memory devices, the data migration controller being configured to perform operations comprising:
selecting a memory unit of data, stored on one of the first memory device or the second memory device, for a time prediction that indicates a future time when a change in a current access count for the memory unit is expected to occur;
at a current time interval, using a schedule machine learning model to generate the time prediction for when the change in the current access count for the memory unit is expected to occur, the time prediction comprising a delta time relative to the current time interval;
based on the time prediction and the current time interval, determining a first future time interval for when the data migration controller will evaluate whether to migrate the memory unit between the first memory device and the second memory device; and
at or after the first future time interval, evaluating whether to migrate the memory unit between the first memory device and the second memory device, the evaluating comprising:
using an access count machine learning model to generate a predicted access count for the memory unit for a second future time interval, the access count machine learning model being trained based on a history of access counts for the memory unit over a plurality of past time intervals, the second future time interval being different from the first future time interval; and
in response to the predicted access count indicating that the memory unit will be accessed frequently at the second future time interval, causing the memory unit to be migrated between the first memory device and the second memory device.

2. The system of claim 1, wherein the memory unit is either a block or a page.

3. The system of claim 1, wherein the predicted access count indicates whether the memory unit will be accessed frequently at the second future time interval.

4. The system of claim 3, wherein the first memory type is faster than the second memory type, wherein the memory unit is stored on the second memory device, and wherein the causing of the memory unit to be migrated between the first memory device and the second memory device based on the predicted access count comprises the memory unit being migrated from the second memory device to the first memory device in response to the predicted access count indicating that the memory unit will be accessed frequently at the second future time interval.

5. The system of claim 3, wherein the first memory type is faster than the second memory type, wherein the memory unit is stored on the first memory device, and wherein the causing of the memory unit to be migrated between the first memory device and the second memory device based on the predicted access count comprises the memory unit being migrated from the first memory device to the second memory device in response to the predicted access count indicating that the memory unit will be accessed frequently at the second future time interval.

6. The system of claim 1, wherein the schedule machine learning model comprises a deep-neural network (DNN).

7. The system of claim 1, wherein the change at least one of exceeds a predetermined threshold value.

8. The system of claim 1, wherein the system is a memory sub-system, and wherein training data for the schedule machine learning model is provided to the memory sub-system by a host system coupled to the memory sub-system.

9. The system of claim 1, wherein change represents a certain percentage of change compared to the current access count.

10. The system of claim 1, wherein the generating of the predicted access count at the first future time interval comprises:
adding a new request to generate the predicted access count to a queue for using the access count machine learning model.

11. The system of claim 10, wherein an entry is added to the queue for the new request, and wherein the entry indicates that the predicted access count is requesting to be fulfilled by the second future time interval.

12. The system of claim 10, wherein an individual request is selected from the queue, for processing using the access count machine learning model, based on a priority of the individual request.

13. The system of claim 12, wherein an entry in the queue for the individual request indicates when the individual request is requested to be fulfilled, and wherein the priority is determined based on when the individual request is requested to be fulfilled.

14. The system of claim 10, wherein an entry is added to the queue for the new request, wherein the entry comprises a memory unit signature to identify the memory unit, and wherein the memory unit signature comprises a plurality of attributes of the memory unit.

15. The system of claim 14, wherein the memory unit signature comprises at least one of a program counter for the memory unit, a load instruction that first accessed the memory unit, a sequence of cache line addresses for the memory unit, or a spatial line bitmask for the memory unit.

16. The system of claim 1, wherein the operations comprise:
recording the predicted access count for the memory unit for the second future time interval;
determining an actual access count of the memory unit during the second future time interval; and
after the second future time interval:
determining whether a difference between the predicted access count and the actual access count exceeds a threshold value; and
in response to determining that the difference exceeds the threshold value, causing the access count machine learning model to be updated by a training process that updates one or more weights or parameters of the access count machine learning model.

17. The system of claim 1, wherein the system is a memory sub-system, and the data migration controller is part of a memory sub-system controller of the memory sub-system.

18. The system of claim 1, wherein at least some portion of the data migration controller is implemented by a processing device of the system.

19. A method comprising:
loading a schedule machine learning model into a local memory of a memory sub-system, the schedule machine learning model being trained by a host system using a monitoring process, the monitoring process profiling data access of a plurality of memory units of data stored on the memory sub-system by a software application operating on the host system, the memory sub-system comprising the local memory, a data migration controller operably coupled to the local memory, a first memory device of a first memory type, and a second memory device of a second memory type;
selecting, by the data migration controller, a memory unit of data stored on one of the first memory device or the second memory device, the memory unit being selected for a time prediction that indicates a future time when a change in a current access count for the memory unit is expected to occur;
at a current time interval, using the schedule machine learning model, by the data migration controller, to generate the time prediction for when the change in the current access count for the memory unit is expected to occur, the time prediction comprising a delta time relative to the current time interval;
based on the time prediction and the current time interval, the data migration controller determining by a first future time interval for when the data migration controller will evaluate whether to migrate the memory unit between the first memory device and the second memory device; and
at or after the first future time interval, the data migration controller evaluating whether to migrate the memory unit between the first memory device and the second memory device, the evaluating comprising:
using an access count machine learning model to generate a predicted access count for the memory unit for a second future time interval, the access count machine learning model being trained based on a history of access counts for the memory unit over a plurality of past time intervals, the second future time interval being different from the first future time interval; and
in response to the predicted access count indicating that the memory unit will be accessed frequently at the second future time interval, causing, by the data migration controller, the memory unit to be migrated between the first memory device and the second memory device.

20. At least one non-transitory machine-readable storage medium comprising instructions that, when executed by a processing device, cause the processing device to perform operations comprising:
while a software application is operating on a host system, monitoring data access, by the software application, of a set of memory units of data stored on a memory sub-system, the memory sub-system being operably coupled to the host system;

based on the monitoring of the data access, generating a history of access counts for each memory unit in the set of memory units over a predetermined number of time intervals;

training a schedule machine learning model based on the history of access counts for at least one memory unit of the set of memory units, wherein the training configures the schedule machine learning model to generate a time prediction for the at least one memory unit, the time prediction indicating a future time when a change in a current access count for the memory unit is expected to occur; and after the training, causing the schedule machine learning model to be loaded by the memory sub-system, a data migration controller of the memory sub-system being configured to perform operations comprising:

at a current time interval, using the loaded schedule machine learning model to generate the time prediction for when the change in the current access count for the memory unit is expected to occur, the time prediction comprising a delta time relative to the current time interval;

based on the time prediction and the current time interval, determining a first future time interval for when the data migration controller will evaluate whether to migrate the memory unit between the first memory device and a second memory device; and at or after the first future time interval, evaluating whether to migrate the memory unit between the first memory device and the second memory device, the evaluating comprising:

using an access count machine learning model to generate a predicted access count for the memory unit for a second future time interval, the access count machine learning model being trained based on a history of access counts for the memory unit over a plurality of past time intervals, the second future time interval being different from the first future time interval;

determining whether the predicted access count indicates that the memory unit will be accessed frequently at the second future time interval; and in response to the predicted access count indicating that the memory unit will be accessed frequently at the second future time interval, causing the memory unit to be migrated between the first memory device and the second memory device based on the predicted access count.

* * * * *